(12) United States Patent  (10) Patent No.: US 7,445,143 B2
Pang et al.  (45) Date of Patent: Nov. 4, 2008

(54) IN-FIELD MONITORING AND MANAGEMENT OF DATA CAPTURE SYSTEMS

(75) Inventors: Robert James Pang, Williston Park, NY (US); Thomas D. Bianculli, Manorville, NY (US); Edward Barkan, Miller Place, NY (US); Robert Sanders, St. James, NY (US); Wynn L. Aker, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/095,177

(22) Filed: Mar. 31, 2005

(65) Prior Publication Data

US 2006/0219779 A1  Oct. 5, 2006

(51) Int. Cl.
*G06F 17/00* (2006.01)

(52) U.S. Cl. ...................................................... 235/375
(58) Field of Classification Search .................. 235/375
See application file for complete search history.

(56) References Cited

U.S. PATENT DOCUMENTS

| 6,507,864 | B1 * | 1/2003 | Klein et al. .................. 709/201 |
| 7,104,456 | B2 * | 9/2006 | Parker et al. ................. 235/486 |
| 2002/0145045 | A1 * | 10/2002 | Waxelbaum ........... 235/462.46 |
| 2005/0103856 | A1 * | 5/2005 | Zhu et al. .............. 235/462.22 |
| 2005/0161511 | A1 * | 7/2005 | Parker et al. ........... 235/472.01 |

* cited by examiner

*Primary Examiner*—Karl D. Frech
*Assistant Examiner*—Tae W Kim
(74) *Attorney, Agent, or Firm*—Kirschstein et al.

(57) ABSTRACT

Management data is uploaded and downloaded in the field to data capture systems, such as electro-optical readers, RFID readers, and imagers, either before, after, or during data capture in a manner transparent to the system without disturbing the data capture.

8 Claims, 2 Drawing Sheets

IN-FIELD MONITORING AND MANAGEMENT OF DATA CAPTURE SYSTEMS

BACKGROUND OF THE INVENTION

Field of the Invention

The present invention generally relates to in-field management of data capture systems, such as electro-optical readers, preferably laser scanners for reading indicia, such as bar code symbols, as well as imagers for capturing an image of such indicia, as well as radio frequency identification (RFID) devices for identifying targets and, more particularly, to communications between a data capture system and a remote host for status monitoring, error reporting and correction, upgrading and like management of the data capture system.

DESCRIPTION OF THE RELATED ART

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

Both one- and two-dimensional symbols can be read by employing moving-beam scanners, as well as solid-state imagers. For example, an image sensor device may be employed which has a one- or two-dimensional array of cells or photosensors which correspond to image elements or pixels in a field of view of the device. Such an image sensor device may include a one- or two-dimensional charge coupled device (CCD) or a complementary metal oxide semiconductor (CMOS) device and associated circuits for producing electronic signals corresponding to a one- or two- dimensional array of pixel information for a field of view.

It is therefore known to use a solid-state device for capturing a monochrome image of a symbol as, for example, disclosed in U.S. Pat. No. 5,703,349. It is also known to use a solid-state device with multiple buried channels for capturing a full color image of a target as, for example, disclosed in U.S. Pat. No. 4,613,895. It is common to provide a two-dimensional CCD with a 640 ×480 resolution commonly found in VGA monitors, although other resolution sizes are possible.

It is also known to use radio waves to automatically identify objects, people, or like targets. An RFID tag or transponder identifies a target. An RFID reader interrogates the tag and converts radio waves reflected back from the tag into digital data.

As satisfactory as such moving-beam scanners, imagers and RFID devices are in capturing data, such data capture systems are not easily updated in the field. Typically, a portable data capture system is connected, and movable relative, to a transaction terminal operative for processing the transaction data captured by the system. It is up to a human user to disconnect the system and initiate the process of connecting the system to a dedicated configuration computer operative for upgrading the system. Alternatively, the user can upgrade each system by scanning parameter bar code symbols which self-configure each system. Such upgrading, however, can lead to costly disruptions due to the system being out of service. In some applications, there is a multitude of systems that are operatively connected to a single transaction terminal. Disconnecting and upgrading each system, in turn, is a laborious procedure. Frequently, many systems are simply not upgraded due to the great effort involved.

In addition, many data capture systems do not have status or error reporting capabilities. When operating problems arise in such systems, much time and effort are required to report the problem, diagnose the problem, and service the problem. It is up to the human user to detect the problem and initiate the process of reporting the failure. This also leads to costly disruptions due to the system being out of service. Servicing generally requires the system to be disassembled for repair. Sometimes, the user has insufficient expertise to recognize the onset of a system problem and delays reporting until a complete system failure has occurred.

SUMMARY OF THE INVENTION

Objects of the Invention

Accordingly, it is a general object of this invention to add in-field management and monitoring functionality to data capture systems, especially portable systems.

It is an additional object of the present invention to manage a data capture system in a manner transparent to the user and to data capture by the system.

It is another object of the invention to enable a data capture system to communicate its operating parameters to a remote host which, in turn, communicates corrective action to the system.

It is a further object of the present invention to upgrade a data capture system by communication with a network, even if the system itself is incapable of hosting a network connection.

Features of the Invention

In keeping with the above objects and others which will become apparent hereinafter, one feature of the present invention resides, briefly stated, in an arrangement for, and a method of, in-field managing a data capture system for capturing transaction data, such as an electro-optical reader for reading indicia, such as bar code symbols, or an imager for imaging a target, or an RFID reader for interrogating a target with radio waves, by operatively connecting a transaction terminal for processing the transaction data, for example, a point of sale workstation, to the data capture system via a wireless or wired link, and by uploading and/or downloading management data over a network to the data capture system without affecting transaction data capture. The data capture system is upgraded by the network, preferably directly from the terminal and not, as in the prior art, by reading special self-configuring parameter symbols, or by being disconnected from the terminal (i.e., taken off-line), then connected to a different dedicated configuration computer remote from the terminal for the upgrade, and then reconnected to the terminal.

The upgrade can be performed, in accordance with this invention, either during transaction data capture, or while data is not being captured by the data capture system. In a software-based embodiment, a middleware program is executed by the terminal to parse the management data and the transaction data, and to transmit the management data to and from the system. In a hardware-based embodiment, a switching device is physically connected between the system and the terminal, and includes a data switch for parsing the management data and the transaction data, and for transmitting the management data to and from the system. A management server aggregates and manages the management data for all the systems on the network.

In both embodiments, the data capture system is remotely upgraded. There is no downtime associated with taking the system off-line for servicing. Monitoring parameters of various operational functions are downloaded for status and error reporting and/or for corrective action. For systems which do not have the built-in capability of hosting a network connection themselves, the hardware-based embodiment is preferred.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
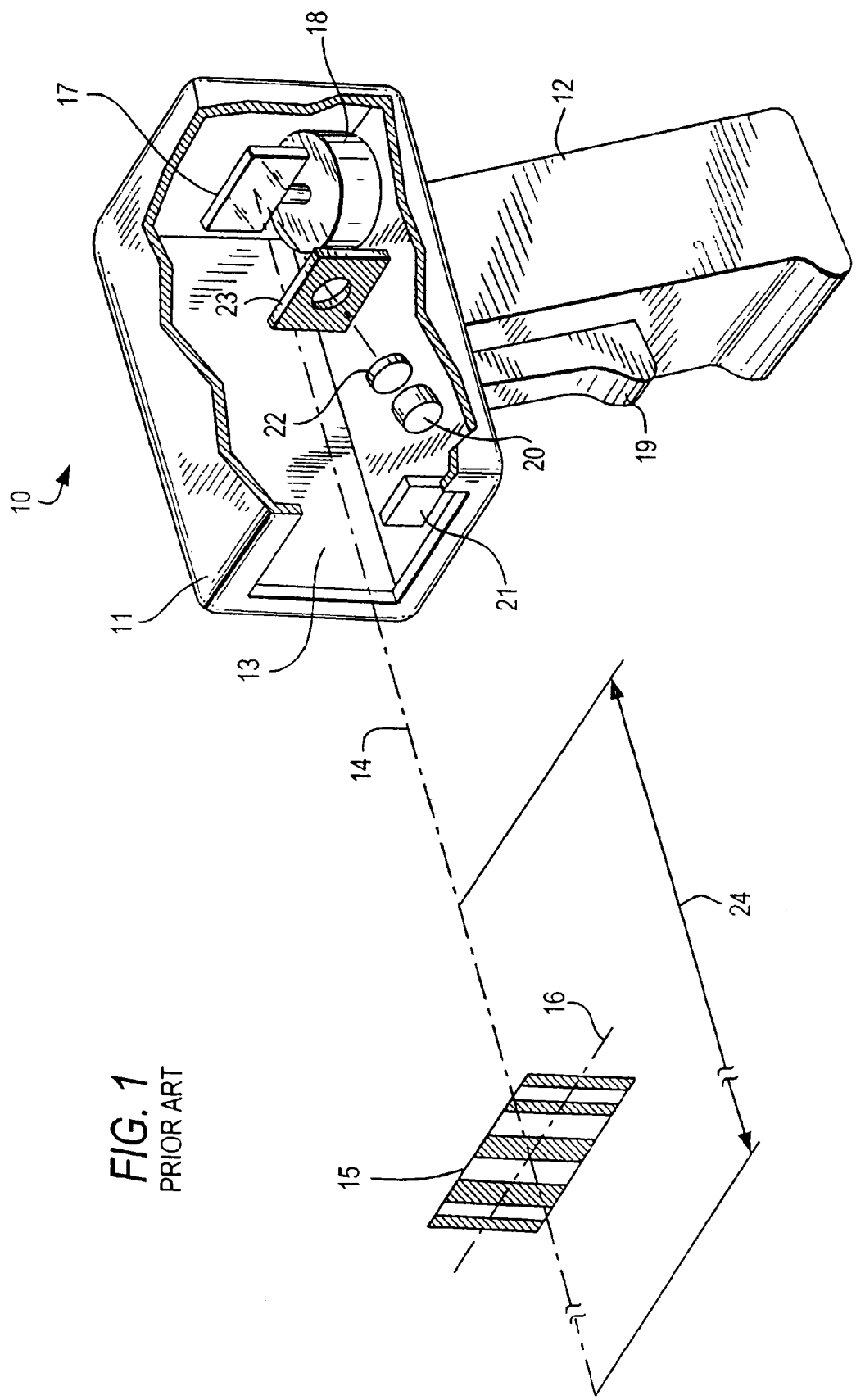
FIG. 1 is a perspective view of an electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. The barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20 mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a convex portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light.

A digitizer typically converts the analog signal into a pulse width modulated digital signal, with the pulse widths and/or spacings corresponding to the physical widths of the bars and spaces of the scanned symbol 15. A decoder, typically comprising a programmed microprocessor with associated random access memory (RAM) and read only memory (ROM), decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24 and substantially normal to the laser beam 14, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
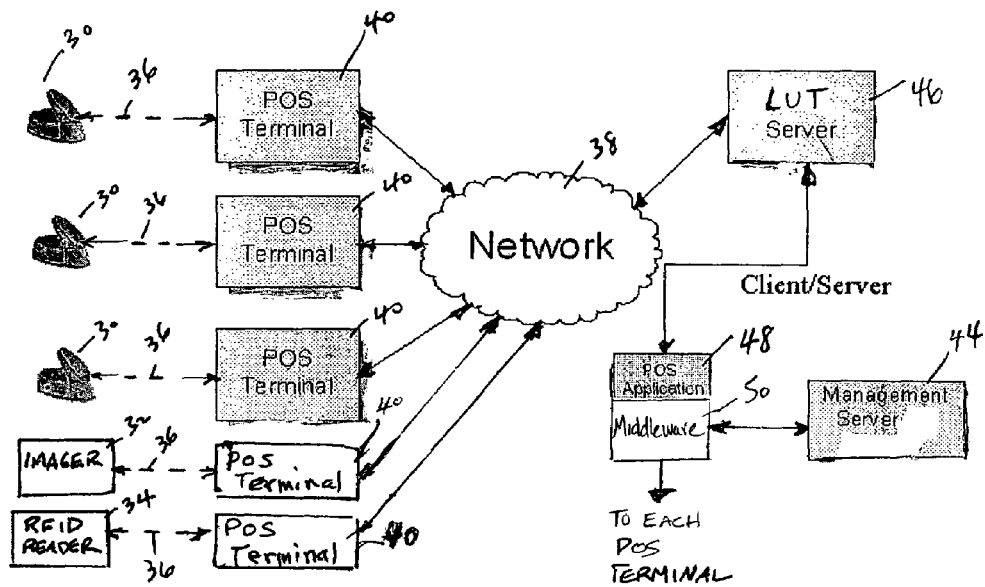
FIG. 2 is a circuit schematic depicting an in-field management arrangement in accordance with one embodiment of the present invention for managing data capture systems, one of which advantageously being the reader of FIG. 1.

As described so far, the handheld scanner device 10 is a data capture system for capturing transaction data indicative of the symbol 15. FIG. 2 depicts one embodiment of an architecture for in-field managing of at least one data capture system, and preferably a multitude of such data capture systems, such as handheld laser scanner devices 30, essentially identical to device 10, imaging reader 32 for capturing an image of the symbol or a target prior to processing the image into the transaction data, and an RFID reader 34 for interrogating an RFID tag or transponder to obtain the transaction data. The illustrated number and type of data capture system in FIG. 2 is merely exemplary, since more or less than the illustrated systems can, and often is, employed in a real-world application. Other data capture systems contemplated by this invention include card readers, such as magnetic stripe readers and smart card readers, and devices having a screen for capturing a signature, a fingerprint, or a human touch.

Figure 3:
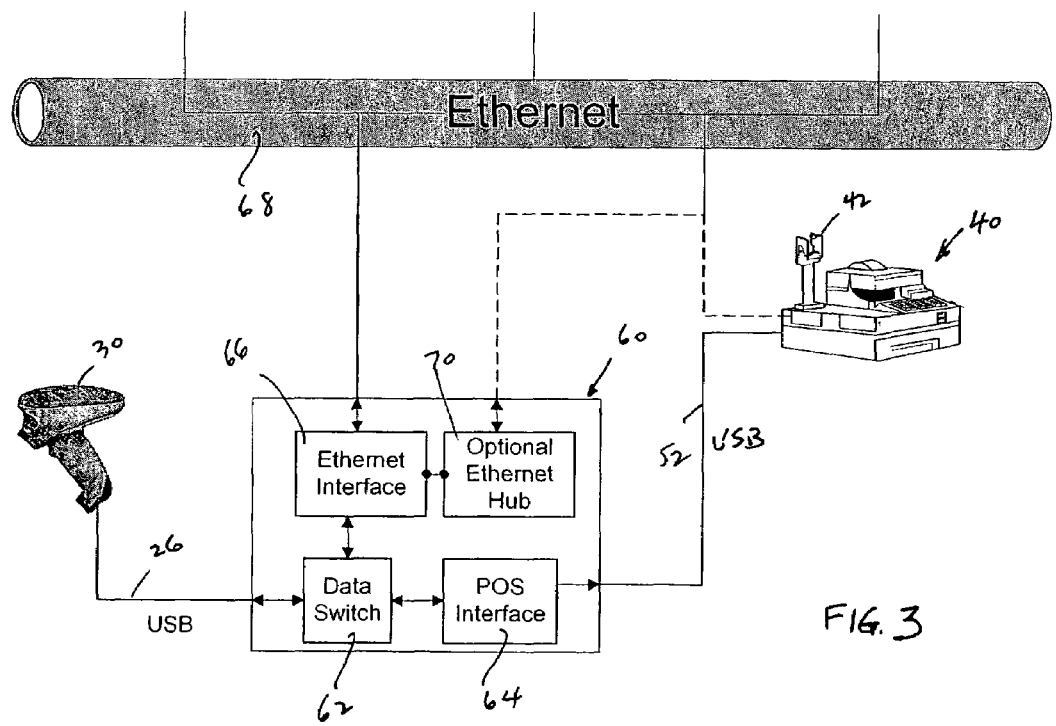
FIG. 3 is a circuit schematic depicting an in-field management arrangement in accordance with another embodiment of the present invention.

Each of these systems has a hard-wired connection 26 (see FIG. 3), or preferably a wireless connection 36 (see FIG. 2) to one or more access points or nodes of a network 38. One of the nodes is depicted as a transaction terminal 40, preferably constituted, as shown in FIG. 3, as a cash register in a supermarket environment. However, it will be understood that the terminal is not to be restricted to a cash register and that any host computer, such as a laptop computer or a desktop computer, will do. Also, the terminal need not be stationary and can be mobile. The term "terminal" is to be interpreted in its broadest sense as any device having intelligence. The terminal 40 may have a cradle 42 for supporting the system. Each system 30, 32, 34 preferably has a wireless transceiver for communication over a wireless interface, such as wide area network (WAN), local area network (LAN), or personal area network (PAN), such as Bluetooth™. As illustrated, a plurality of transaction terminals 40 are often configured in the network 38. Each system is preferably handheld, portable and movable relative to the terminal to which it is operatively connected by a wired or a wireless connection.

Each transaction terminal 40 is operative for executing a POS application 48 loaded on the terminal 40 and operative for processing the transaction data captured by a respective system. This typically involves retrieving information, for example, prices, from a look-up table (LUT) on the network 38, or retrieving inventory information, with the aid of a LUT server 46. Each transaction terminal is also operative for executing a middleware program 50, as explained below.

In accordance with one feature of this invention, update data is uploaded from the terminal to one, some, or all the data capture systems. From time to time, the firmware on each system is updated for enhanced system operation. Typically, a management server 44, for example, a computer, is operatively connected over the network 38 to all the terminals 40 and their associated data capture systems. The management server 44 initiates the upload over the network 38 to the transaction terminal 40 which, in turn, communicates the update data to the system. If the terminal permits, the upload can be initiated from the terminal itself.

Also, monitoring data generated by the system itself and indicative of various operating conditions being monitored, such as the identification, health and statistics of the system, is downloaded from one or more of the systems to one or more of the terminals over the network 38 to the management server 44. Any one of the system itself, the terminal 40 or the management server 44 may initiate the download. Corrective action by the management server is uploaded to the system being monitored.

The uploading and downloading of management data in the architecture of FIG. 2 is based on software, namely the middleware software 50 running on each terminal 40 between the standard transaction data processing application 48 and the physical interface to the system. The middleware, once installed, is completely transparent to the data capture operation, as well as to any user of the system. The system captures transaction data and sends the transaction data, together with any management data, to the middleware 50. The middleware 50 is operative to parse the incoming data and to send the transaction data to the transaction data processing application 48 responsible for decoding the captured data and retrieving information, and to send the management data to a buffer to be formatted and then forwarded to the management server 44. The server 44 aggregates and manages the management data for all the systems within an enterprise.

FIG. 3 depicts an architecture in which the uploading and downloading of the management data is based on hardware, namely a switching device 60 located between the system 30 and the terminal 40. The hard-wired connection 26, preferably a Universal Series Bus (USB) connection, is made between the system 30 and an input to the device 60. Another hard-wired connection 52, preferably a USB connection, is made between an output of the device 60 and the terminal 40.

The device 60 includes a data switch 62 for parsing incoming data as transaction data or management data. The transaction data is sent via a POS interface 64 to the terminal 40 for transaction processing.

The management data is sent via an ethernet interface 66 directly to the network 38 via an ethernet connection 68, or through an optical ethernet hub 70 to the terminal 40. Once on the network 38, the management data is formatted and sent to the server 44 which, as before, aggregates and manages the management data for all the systems within an enterprise.

Whether hardware- or software-based, the arrangement of this invention separates the management data and the transaction data so that each is separately routed and processed. Although it is preferred that the middleware 50 be resident on the terminal 40, it could also be loaded on the system, or be distributed on both the terminal and the system. All communication is bi-directional. Hence, the monitoring of various operational parameters of the system, for example, the number of successful or unsuccessful data captures, or the status of various components of the system, is downloaded from the system and, in response, corrective action is uploaded to the system. Management data, such as system upgrades for enhanced operation, is uploaded from the management server or the terminal, and verification of the successful complete upload is downloaded to the management server. The processing of the management data occurs in the background and does not interfere with the processing of the transaction data.

It will be understood that each of the elements described above, or two or more together, also may find a useful application in other types of constructions differing from the types described above.

While the invention has been illustrated and described as embodied in in-field monitoring and management of data capture systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An arrangement for in-field managing at least one data capture system operative for capturing transaction data, comprising:

a transaction terminal operatively connected to the at least one data capture system and operative for processing the transaction data;

means for transmitting management data to and from the at least one data capture system during capture of the transaction data, and for verifying a successful transmission of the management data to the at least one data capture system;

a host operatively connected over a network to the transaction terminal; and a data switch physically connected between the at least one data capture system and the transaction terminal and operative for parsing the management data and the transaction data, and for transmitting the management data over the network in a manner transparent to a user of the at least one data capture system.

2. The arrangement of claim 1, wherein the transaction terminal is a workstation, and wherein the at least one data capture system is an electro-optical reader for reading indicia.

3. The arrangement of claim 2, wherein the reader is operatively connected to the transaction terminal by one of a wired and a wireless link.

4. The arrangement of claim 2, wherein the reader is one of a laser scanner for scanning the indicia with a laser beam, and an imager for capturing an image of the indicia.

5. The arrangement of claim 1, wherein the at least one data capture system is a handheld device movable relative to the terminal.

6. The arrangement of claim 1, wherein the at least one data capture system is a radio frequency identification (RFID) device.

7. The arrangement of claim 1, wherein the transmitting means is operative for uploading the management data to the at least one data capture system via the terminal.

8. The arrangement of claim 1, wherein the transmitting means is operative to upload correction data while the at least one data capture system is capturing the transaction data.

* * * * *